(12) United States Patent
Borrel et al.

(10) Patent No.: US 6,384,821 B1
(45) Date of Patent: May 7, 2002

(54) METHOD AND APPARATUS FOR DELIVERING 3D GRAPHICS IN A NETWORKED ENVIRONMENT USING TRANSPARENT VIDEO

(75) Inventors: Paul Borrel, White Plains; Shawn Hall, Pleasantville; William P. Horn, Scarsdale; James T. Klosowski, Rye; William L. Luken, Yorktown Heights; Ioana M. Martin, Mohegan Lake; Frank Suits, Garrison, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/411,312

(22) Filed: Oct. 4, 1999

(51) Int. Cl.$^7$ .............................................. G06T 17/00

(52) U.S. Cl. ...................................................... 345/421

(58) Field of Search ................................ 345/418, 419, 345/420, 421, 422, 423, 424, 425

(56) References Cited

U.S. PATENT DOCUMENTS

| | | | |
|---|---|---|---|
| 4,737,921 A | 4/1988 | Goldwasser et al. | |
| 5,408,272 A | 4/1995 | Barnett et al. | |
| 5,696,948 A | 12/1997 | Cruz et al. | |
| 5,729,669 A | 3/1998 | Appleton | |

OTHER PUBLICATIONS

B. Schneider et al., "An Adaptive Framework for 3D Graphics in Networked and Mobile Environments", Proc. Workshop on Interactive Applications of Mobile Computing, IMC '98, Nov. 1998.

Y. Mann et al., "Selective Pixel Transmission for Navigating in Remote Virtual Environments", Proc. Eurographics '97, vol. 16, No. 3, 1997.

M. Levoy, "Polygon–Assisted JPEG and MPEG Compression of Synthetic Images", ACM Proc. Siggraph '95, Aug. 1995, pp. 21–28.

D. Aliaga, et al., "Architectural Walkthroughs Using Portal Textures", IEEE Visualization '97, pp. 355–362, Oct. 1997.

Luken et al., "PanoramIX: Photorealistic Multimedia 3D Scenery", IBM Research Report #RC21145, IBM T.J. Watson Research Center, 1998.

(List continued on next page.)

Primary Examiner—Cliff N. Vo
(74) Attorney, Agent, or Firm—Whitham, Curtis & Christofferson, P.C.; Louis J. Percello

(57) ABSTRACT

A system and method for seamlessly combining client-only rendering techniques with server-only rendering techniques. The approach uses a composite stream containing three distinct streams. One stream is available to send geometry from the server to the client. Another stream contains video with transparent pixels that allow the client-rendered object to appear in the context of the server rendered objects. The third stream contains camera information. The invention can satisfy a number of viewing applications. For example, initially the most relevant geometry can stream to the client for high quality local rendering while the server delivers renderings of less relevant geometry at lower resolutions. After the most relevant geometry has been delivered to the client, the less important geometry can be optionally streamed to the client to increase the fidelity of the entire scene. In the limit, all of the geometry is transferred to the client and the situation corresponds to client-only rendering system where local graphics hardware is used to improve fidelity and reduce bandwidth. Alternatively, if a client does not have local three-dimensional graphics capability then the server can transmit only the video of the server-rendered object and drop the other two streams. In either case, the approach also permits for a progressive improvement in the server-rendered image whenever the scene becomes static. Bandwidth that was previously used to represent changing images is allocated to improving the fidelity of the server-rendered image whenever the scene becomes static.

32 Claims, 13 Drawing Sheets

OTHER PUBLICATIONS

H. Zhang et al., "Visibility Culling Using Hierarchical Occlusion Maps", ACM Proc. Siggraph '97, Aug. 1997, pp. 77–88.

D. Aliaga, et al., "Visualization of Complex Models Using Dynamic Texture–based Simplification", IEEE Visualization '96, pp. 101–106, Oct.–Nov. 1996.

Garland, et al, "Surface Simplification Using Quadric Error Metrics", ACM Proc. Siggraph '97, Aug. 1997, pp. 209–216.

H. Hoppe, "Progressive Meshes", ACM Proc. Siggraph '98, Aug. 1996, pp. 99–108.

G. Taubin, et al., "Progressive Forest Split compression", ACM Proc. Siggraph '98, Jul. 1998, pp. 123–132.

G. Taubin, et al., "Geometric Compression Through Topological Surgery", ACM Transactions on Graphics, vol. 17, No. 2, Apr. 1998, pp. 84–115.

W. Meloni, "The Web Looks Toward 3D" Computer Graphics World, 21(12), Dec. 1998, pp. 20.

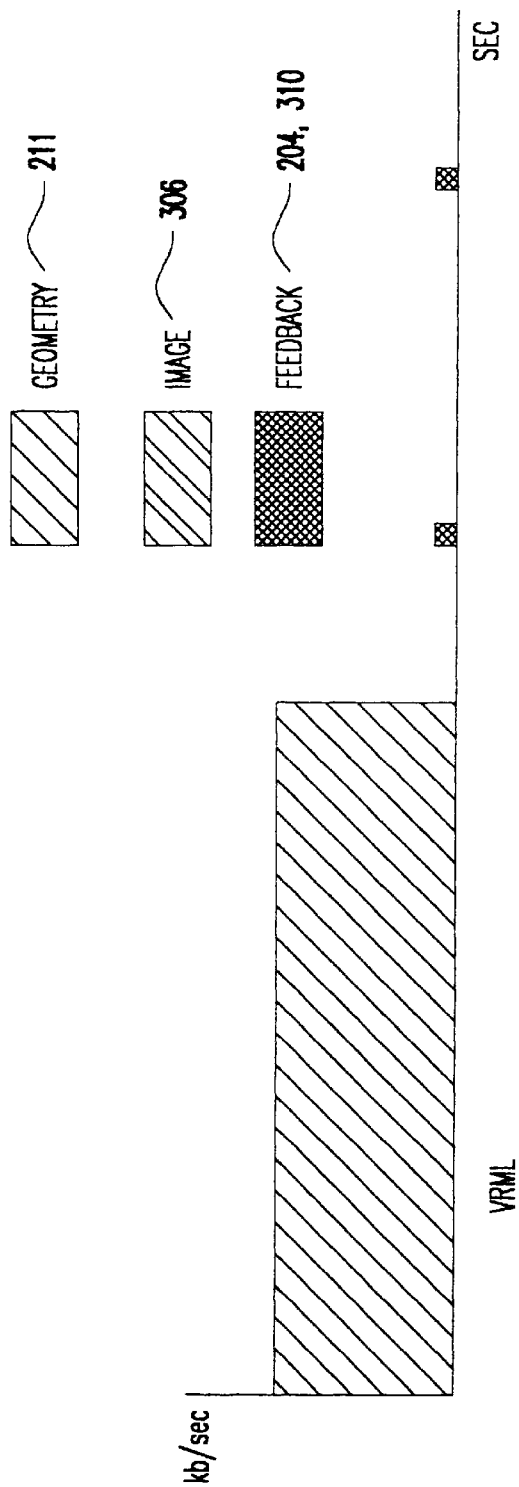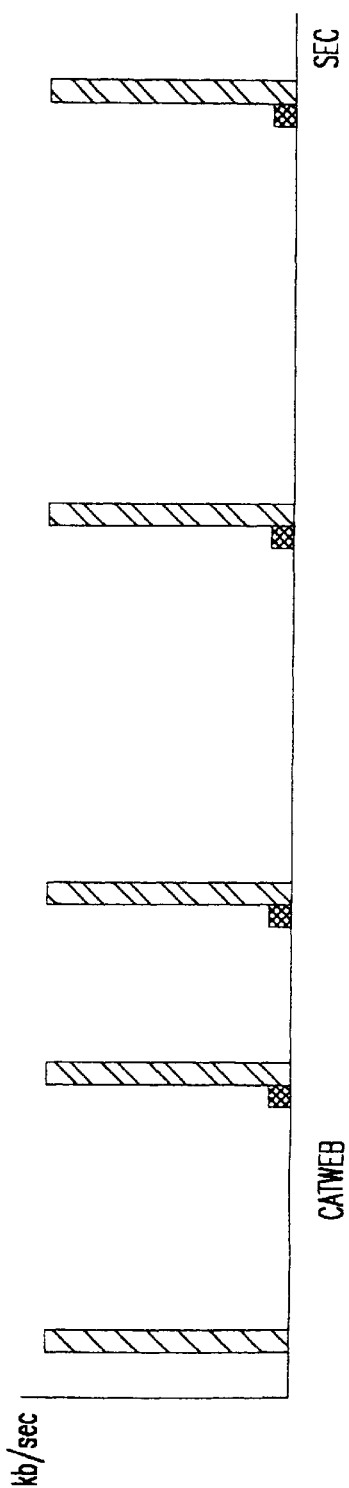
FIG. 8A PRIOR ART
FIG. 8B

US 6,384,821 B1

METHOD AND APPARATUS FOR DELIVERING 3D GRAPHICS IN A NETWORKED ENVIRONMENT USING TRANSPARENT VIDEO

CROSS-REFERENCE TO RELATED APPLICATION

The subject matter of this application is related to the disclosure of co-pending U.S. patent application Ser. No. 09/411,313 filed Oct. 4, 1999 by Paul Borrel, Shawn Hall, William P. Horn, James T. Klosowski, William L. Luken, Ioana M. Martin, and Frank Suits for "Methods and Apparatus for Delivering 3D Graphics in a Networked Environment" and assigned to a common assignee herewith. The disclosure of U.S. patent application Ser. No. 09/411,313 is incorporated herein by reference.

DESCRIPTION

Background of the Invention

1. Field of the Invention

The present invention generally relates to graphics processing and display systems and, more particularly, to the creation and presentation of three-dimensional scenes of synthetic content stored on distributed network sources and accessed by computer network transmission. The invention further relates to methods of adaptively selecting an optimal delivery strategy for each of the clients based on available resources.

2. Background Description

Using three-dimensional graphics over networks has become an increasingly effective way to share information, visualize data, design components, and advertise products. As the number of computers in the consumer and commercial sectors with network access increases, the number of users accessing some form of three-dimensional graphics is expected to increase accordingly. For example, it has been estimated by W. Meloni in "The Web Looks Toward 3D", *Computer Graphics World,* 21(12), December 1998, pp. 20 et seq., that by the end of year 2001, 152.1 million personal computers (PCs) worldwide will have an Internet connection. Out of this number, approximately 52.3 million users will frequently access three-dimensional images while on the World Wide Web (WWW or the Web). This number compares to only 10 million users accessing three-dimensional Web images in 1997 out of a total of 79 million Internet users. However, the use of three-dimensional graphics over networks is not limited to consumer applications. In 1997, roughly 59% of all U.S. companies had intranet connections. By 2001 this figure is expected to jump to 80%. This transition includes three-dimensional collaboration tools for design and visualization. For instance, within the computer-aided design (CAD) community there is significant interest in applications which permit sharing on a global basis of three-dimensional models among designers, engineers, suppliers and other interested parties across a network. The capability to perform "visual collaborations" offers the promise to reduce costs and to shorten development times. Other corporate interests target the use of three-dimensional solutions to visualize data such as financial fluctuations, client accounts, and resource allocations.

As generally shown in FIG. 1, three-dimensional models and their representations are typically stored on centralized servers 100 and are accessed by clients 101 over communication networks 102. Several data-transfer technologies have been developed over the past few years to visualize three-dimensional models over networks.

At one end of the spectrum are the so-called client-side rendering methods in which the model is downloaded to the client which is entirely responsible for its rendering. FIG. 2 shows a diagram of a typical client-side rendering architecture. Upon input from a user or another application 201, the client 202 requests, via network 203 as client feedback 204, a model from the server 205. The geometry server 210 within server 205 contains the 3d geometry 211 and the scene parameters 212. In response to client feedback 204, the server 205 retrieves the model from storage 206 and delivers the 3d geometry 213 to the client 202 over the network 203. Once the model has been received by the client, the client 3d browser 208 renders it in client rendering engine 207 and displays it on the display 209. Additional client feedback may follow as the user interacts with the model displayed and more information about the model is downloaded. Such methods typically require a considerable amount of time to download and display on the client an initial meaningful representation of a complex three-dimensional model. These methods also require the existence of three-dimensional graphics capabilities on the client machines.

Alternatives to en masse downloading of a model without prior processing include storage and transmission of compressed models, as reported by G. Taubin and J. Rossignac in "Geometry Compression Through Topological Surgery", *ACM Transactions on Graphics,* April 1998, pp. 84–115, streaming and progressive delivery of the component geometry, as reported by G. Taubin et al. in "Progressive Forest Split Compression", *ACM Proc. Siggraph* '98, July 1998, pp. 123—132, H. Hoppe in "Progressive Meshes", *ACM Proc. Siggraph* '98, August 1996, pp. 99–108, and M. Garland and P. Heckbert in "Surface Simplification Using Quadric Error Bounds", *ACM Proc. Siggraph* '97, August 1997, pp. 209–216, and ordering based on visibility, as reported by D. Aliaga in "Visualization of Complex Models Using Dynamic Texture-Based Simplification", *Proc. IEEE Visualization* '96, October 1996, pp. 101–106, all of which are targeted towards minimizing the delay before the client is able to generate an initial display. However, producing such representations may involve significant server computing and storage resources, the downloading time remains large for complex models, and additional time may be necessary on the client to process the data received (e.g., decompression). For example, Adaptive Media's Envision 3D (see www.envision.com) combines computer graphics visibility techniques (e.g., occlusion culling as described by H. Zang et al., "Visibility Culling Using Hierarchical Occlusion Maps", *ACM Proc. Siggraph* '97, August 1997, pp. 77–88) with streaming to guide the downloading process by sending to the clients the visible geometry first and displaying it as it is received, rather than waiting for the entire model to be sent. Nonetheless, determining which geometry is visible from a given viewpoint is not a trivial computation and maintaining acceptable performance remains a challenging proposition even when only visible geometry is transmitted.

At the opposite end of the spectrum are server-side rendering methods, as generally shown in FIG. 3, which place the burden of rendering a model entirely on the server and the images generated are subsequently transmitted to clients. As in the case of client-side methods, the client 301 usually initiates a request for a model. However, instead of downloading the three-dimensional model to the client 301, the model and scene description 302 stored in storage 303 is rendered on the server 304 in rendering engine 305 to produce two-dimensional static images 306, and one or more two-dimensional images 307 resulting from this rendering are transmitted over the network 308 to the client 301. Subsequently, the images 307 are displayed on display 309 of the client 301. The cycle is then repeated based on user feedback 310.

Such techniques have the advantages that they do not require any three-dimensional graphics capabilities on the part of the clients and the bandwidth requirements are significantly reduced. The tradeoffs in this case are the loss of real-time interaction with the model (i.e., images cannot be delivered to clients at interactive frame rates) and the increase in server load and hence, server response times, as the number of clients concurrently accessing the server increases. An example of a server-side-based rendering system is CATWeb (www.catia.ibm.com) which is a web browser-based application designed to provide dynamic CAD data access to users with intranet connections and graphics capabilities. Another example in this category is panoramic rendering described by W. Luken et al. in "PanoramIX: Photorealistic Multimedia 3D Scenery", *IBM Research Report* #RC21145, IBM T. J. Watson Research Center, 1998. A panorama is a 360 degree image of a scene around a particular viewpoint. Several panoramas can be created for different viewpoints in the scene and connected to support limited viewpoint selection.

Hybrid rendering methods described by D. Aliaga and A. Lastra in "Architectural Walkthroughs Using Portal Textures", *Proc. IEEE Visualization '97*, October 1997, pp. 355–362, M. Levoy in "Polygon-Assisted JPEG and MPEG Compression of Synthetic Images", *ACM Proc. Siggraph '95*, August 1995, pp. 21–28, and Y. Mann and D. Cohen-Or in "Selective Pixel Transmission for Navigating in Remote Virtual Environments", *Proc. Eurographics '97*, 16 (3), September 1997, pp. 201–206, provide a compromise approach by rendering part of a complex model on the server (usually components that are far away from the viewer or of secondary interest) and part on the client. Thus, a combination of images (possibly augmented with depth information) and geometry is delivered to the client. For example, the background of a three-dimensional scene may be rendered on the server as a panorama with depth information at each pixel. Foreground objects are delivered as geometry to the client and correctly embedded into the panorama using the depth information. The main advantage of such an approach is that the time to transmit and display on the client the server-rendered parts of the model is independent of the scene complexity, while the frame rate and the interaction with the client-rendered parts are improved. Additional processing of the image and geometry data may be done to optimize their transfer over the network. For instance, in M. Levoy, supra, image compression is applied to the two-dimensional data and model simplification and compression are performed on the three-dimensional data before they are sent to the client. Some of the disadvantages of hybrid rendering methods are the fact that determining whether a part of a given model should be rendered on the server or on the client is usually not a trivial task, extra image information is often required to fill in occlusion errors that may occur as a result of a viewpoint change on the client, and limited user interaction.

Although the subject has been addressed by B. O. Schneider and I. Martin in "An Adaptive Framework for 3D Graphics in Networked and Mobile Environments", *Proc. Workshop on Interactive Applications of Mobile Computing (IMC '98)*, November 1998, in general, commercial methods for delivering three-dimensional data over networks are not adaptive. They do not take into account dynamic changes in system environment conditions such as server load, client capabilities, available network bandwidth, and user constraints. In addition, the lack of standards and the increasing complexity of the models have contributed to limiting the success of existing technologies.

SUMMARY OF THE INVENTION

It is therefore an object of the present invention to provide a system and method which provides a continuous, seamless spectrum of rendering options between server-only rendering and client-only rendering.

Another object of the invention is to provide a user-controlled tradeoff between the quality (fidelity) of the rendered image and the frame rates at which the rendered image is displayed on the client.

It is yet another object of the invention to provide a system and method which provides rendering options that adaptively track a dynamic network environment.

Yet another object of this invention is to provide a system and method that uses dead reckoning techniques to avoid latency problems in a network.

According to the invention, there is provided a novel approach to the problem of seamlessly combining client-only rendering techniques with server-only rendering techniques. The approach uses a composite stream containing three distinct streams. One stream is available to send geometry from the server to the client, for local rendering if appropriate. Another stream contains video with transparent pixels that allow the client-rendered object to appear in the context of the server-rendered object. The third stream contains camera information that allows the client to render the client object in the same view as the server-rendered object.

The invention can satisfy a number of viewing applications. If the client does not have adequate rendering performance, the entire scene can be rendered on the server and only video needs to be sent to the client. On the other hand, if the client does have good rendering performance the server can initially render the entire scene, but begin streaming geometry for parts of the scene as the interaction progresses. As more geometry arrives at the client, the server will be doing less rendering for the scene since more of the content is available for local rendering on the client. The transfer of geometry can be terminated by the user on the client side, by some specified cut-off limit, or the entire scene can be transferred to the client. Alternatively, the local object may already exist at both the client and server, so no geometry need be sent; the server will render the scene and mark transparent the pixels due to the local object, and the client will render locally and fill them in without any geometry having been streamed from server to client. Regardless of the specific amount of geometry being transferred, the server can always dynamically alter the fidelity of the video being sent in order to trade off quality with bandwidth. Whenever the view of the scene is not changing, the video may become progressively refined.

BRIEF DESCRIPTION OF THE DRAWINGS

The foregoing and other objects, aspects and advantages will be better understood from the following detailed description of a preferred embodiment of the invention with reference to the drawings, in which:

FIG. 8A is a diagram illustrating prior art client rendering bandwidth requirements;

FIG. 8B is a diagram illustrating prior art server rendering bandwidth requirements;

DETAILED DESCRIPTION OF PREFERRED EMBODIMENTS OF THE INVENTION

Figure 1:
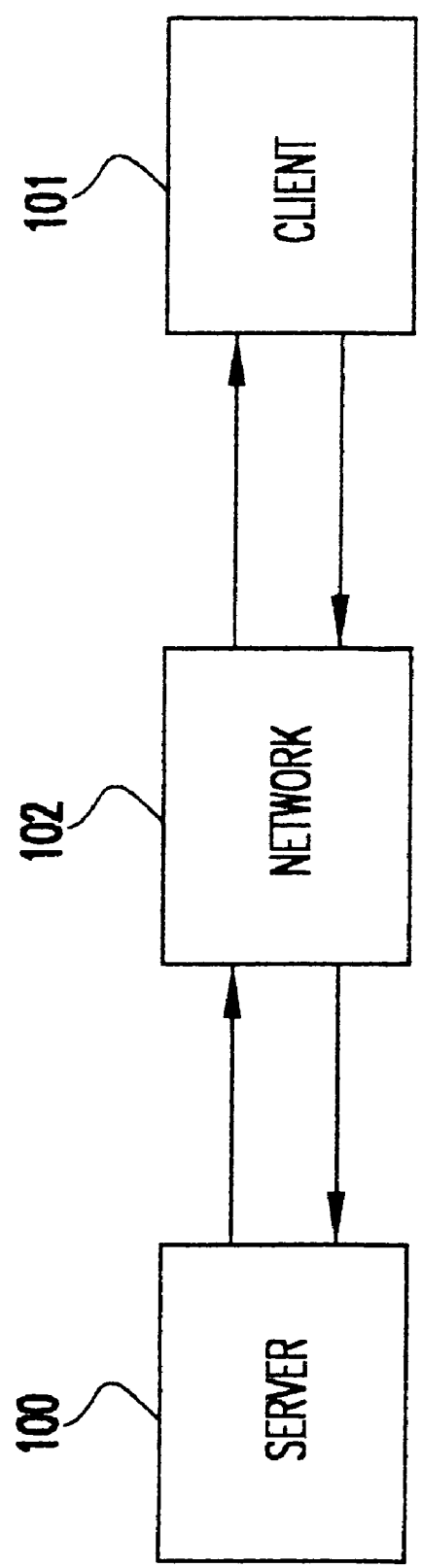
FIG. 1 is a block diagram showing a prior art client-server architecture.

This invention is a system which provides a continuous, seamless spectrum of rendering options between server-only rendering and client-only rendering. The system adaptively chooses a particular rendering option to accommodate system factors such as:

available network bandwidth, client three-dimensional graphics capabilities, central processing unit (CPU) capabilities, and CPU load;

server three-dimensional graphics capabilities, CPU capabilities, and CPU load;

display image size;

eye position used for rendering;

scene complexity (for example number of connected components, number of triangles, and so forth);

depth complexity;

division of geometry between the foreground and the background; and the number of pixels per triangle.

The present invention is a system for generating and delivering rendered images of synthetic content, consisting of one or a plurality of three-dimensional geometric models, across a computer network. The system uses a server computer and a client computer and permits the rendering of one or several geometric models on the server computer, on the client computer, or a combination of the two, for the purposes of visualizing and interacting with the three-dimensional geometric models on the client.

The approach utilizes a composite stream containing three distinct streams. One stream is available to send geometry from the server to the client, for local rendering if appropriate. Another stream contains video with transparent pixels that allow the client-rendered object to be revealed in the video at those pixel locations the server has deduced the client-rendered object will be in front of the server-rendered object. The video stream with its transparent pixels is referred to as the "bideo" stream. The third stream contains camera information that allows the client to render the client object in the same view as the server-rendered object.

One novel feature of the present invention is the methods used by the client to perform the compositing operation. For example, in one method, the server knows exactly which pixels it will contribute to the final image and marks those pixels as transparent to inform the compositor on the client whether to use the client-rendered or the server-rendered pixel.

The present invention is particularly useful in applications involving a large, centrally-located CAD database with many client computers of varying graphics capabilities accessing one or several models over computer networks of variable bandwidths. The invention can also be used, however, to satisfy a number of viewing applications. For example, initially the most relevant geometry can be streamed to the client for high quality local rendering, while the server delivers renderings of less relevant geometry at lower resolutions. After the most relevant geometry has been delivered to the client, the less important geometry can be optionally streamed to the client to increase the fidelity of the entire scene. In the limit, all of the geometry is transferred to the client and this situation corresponds to client-only rendering systems where local graphics hardware is used to improve fidelity and reduce bandwidth. Alternatively, if a client does not have local three-dimensional graphics capability, the server can transmit only the video of the server-rendered objects and drop the other two streams. In either case, as an additional feature, the approach permits for a progressive improvement in the server-rendered image whenever the camera is no longer being manipulated by the client, and the scene becomes static. Bandwidth that was previously used to represent changing images is allocated to improving the fidelity of the server-rendered image whenever the scene becomes static.

Figure 4:
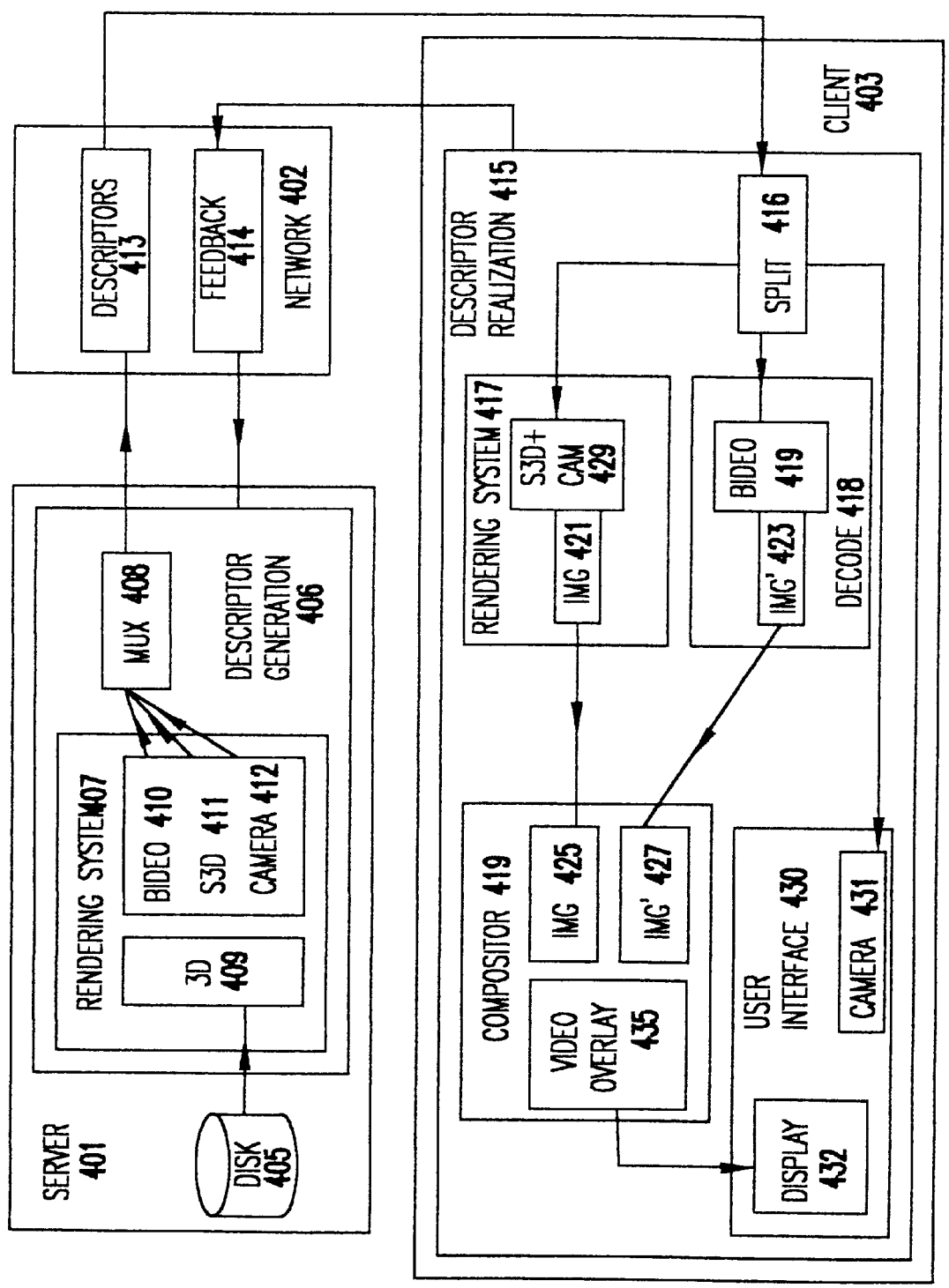
FIG. 4 is a block diagram showing an overview of a typical networking environment using the present invention.

FIG. 4 is a block diagram showing a typical networking environment using the present invention. The figure describes a system 400 comprising a server computer 401, a computer network 402, and a client computer 403. The server 401 further comprises a disk 405 where one or a plurality of geometric models are stored, and a descriptor generating system 406. The descriptor generating system 406 contains a rendering system 407 and a multiplexer 408. The rendering system 407 contains a three-dimensional facility 409 for processing scenes of three-dimensional geometric models, and feeds systems 410, 411 and 412 that support three different output types. The bideo system 410 generates partially transparent images, also referred to as bideo, which may be compressed. Bideo information consists of video with some of the pixels in each image marked transparent. The three-dimensional system 411 generates streamed three-dimensional geometry. The camera system 412 maintains the parameters describing the camera. The server 401, and in particular the descriptor generating system 406, are described in greater detail in FIG. 5.

The network 402 in this environment is responsible for passing descriptors 413 from the server computer 401 to the client computer 403, as well as passing feedback 414 from the client computer 403 back to the server 401. Descriptors 413 is a term used to describe what is being sent from the server to the client as well as the actual data that is being transmitted. For example, the descriptors 413 can indicate that the server is sending only images, in the case of server-only rendering; only geometry, in the case of client-only rendering; or bideo and camera parameters, in the case of server and client rendering. The feedback 414 information that is being sent from the client 403 to the server 401 is a means for the client 403 to specify what it would like the server 401 to do. For example, the client 403 could indicate specific components of the geometric models in disk 405 that it would like the server 403 to send to it for local rendering, or it could tell the server 401 to send higher, or lower, quality images. The feedback 414 mechanism used by the present invention is described in greater detail in FIGS. 6 and 7.

A descriptor realization system 415 resides on the client computer 403, where the descriptors 413, sent via the network 402, are utilized to visualize the synthetic content. The descriptor realization system 415 consists of a demultiplexer 416, which splits the incoming stream of data into separate streams, and forwards the streams to either the rendering system 417, the bideo decoder 418, or the compositor 419.

If geometric models are being sent to the client 403, the streamed three-dimensional geometry 411 and the camera parameters 412, are sent to the client's rendering system 417. The geometry is then rendered on the client 403 using the camera 420, and the framebuffer is read to compute the output: the RGB (red, green, blue) color image values 421. The outputs are then sent to the compositor 419.

If bideo 410 has been sent to the client 403, it is forwarded by the splitter 416 to the decoder 418. The decoder 418 decompresses the bideo frames and feeds successive images 423 of the server-rendered geometry with transparent pixels to the compositor 419. In the case of server-only rendering, the bideo 410 would not contain any transparent pixels and would be sent directly to the display 432.

If camera parameters 412 are sent to the client, the splitter 416 also forwards these parameters to the user interface 430. The compositor 419 accepts as input the two image streams corresponding to the client-rendered images 425 and server-rendered images 427 with transparent pixels. It is not necessarily the case that both of these input values are actually present all of the time.

In server-only rendering, the compositor 419 would only accept the image stream 423 from the decoder 418. For client-only rendering, the compositor 419 would only need to accept the image stream 421 from the client rendering system 417.

In these extreme cases, the compositor 419 has little to do other than to pass the image streams 421 or 423 along to the display 432 for the user to see. It is only when the synthetic content is a combination of server and client rendering that the compositor 419 has actual work to do. In this case, the compositor 419 uses a video overlay 435 to place the server-rendered bideo image 427 over the client-rendered image 425 so that the client-rendered image 425 can show through the transparent pixels of the server-rendered bideo image 427.

If the camera parameters 412 on the server 401 and the client 420 are within a specified tolerance level, then the bideo image 427 and the client-rendered image 425 can be directly overlaid to create a correctly registered image of the combined scene. However, if there is a significant difference in the camera parameters, the system can choose to ignore the server-rendered images, and only display the client-rendered images to prevent the user from becoming disoriented.

The output of the compositor 419 is an image presented to the user on the computer display 432. The user interface 430 is a mechanism for the user to send feedback 414 to the server. For example, if the user wishes to visualize the geometric models from a different viewpoint, updated camera parameters 420 can be sent back to the server 401. Additional information can also be passed back to the server 401 through this interface. Feedback 414 sent from the client 403 to the server 401 is further discussed in FIGS. 6 and 7.

Figure 5:
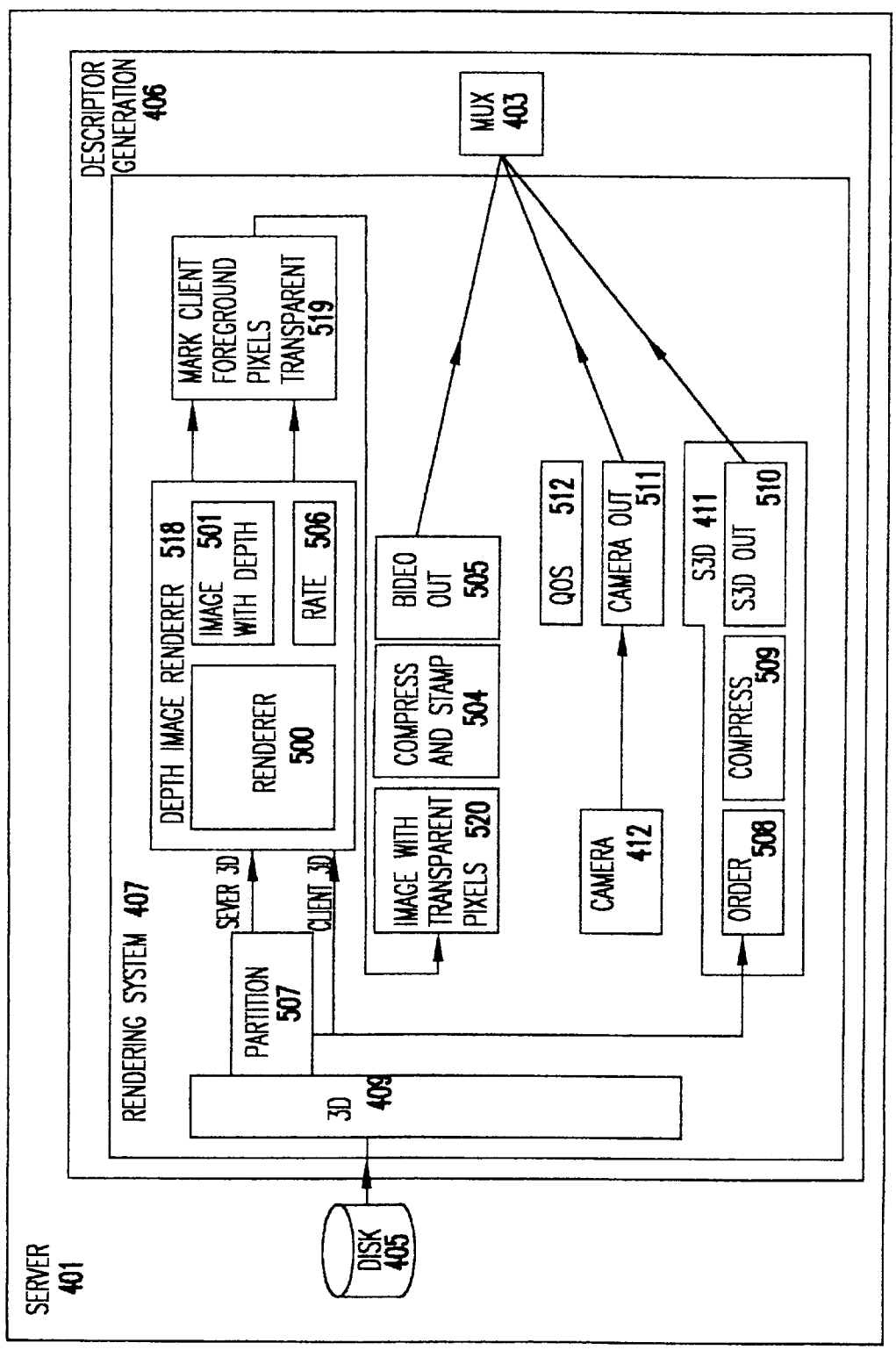
FIG. 5 is a block diagram showing the descriptor generation component of the invention.

FIG. 5 is a block diagram showing the descriptor generation component 406 of the current invention. Recall that the server 401 is comprised of a disk 405 used to store geometric models, and a descriptor generating system 406, for generating synthetic content to be sent across a computer network 402. The descriptor generating system 406 is further broken down into a rendering system 407 and a multiplexer 408, which is used for combining the bideo 410, s3d 411, and camera outputs 412 produced by the rendering system 407.

The rendering system 407 contains a three-dimensional facility 409 for processing scenes of three-dimensional geometric models. The three-dimensional facility 409 manages the data that is being visualized, by loading it into the main memory of the computer and by handling requests from clients who may wish to make modifications, e.g., transformations, to the scene of geometric models.

The three-dimensional facility 409 also passes the geometric data to a partition facility 507 that divides the three-dimensional scene into two parts: client and server. The client and server parts each go to the depth image renderer 518, while the client part also goes the the s3d facility 411.

Using the camera parameters 412 of the server 401, the renderer 500 of bideo system 410 renders geometric models passed to it by the partition facility 507. The rendered images with depth 501 may then be sent to the computer display 432 on the client 403, although this is not required. After the geometry has been rendered, the framebuffer is read and the RGB image 501 with z-buffer or depth information is passed to the bideo system's transparency facility 519, which compares the z-buffer of the pixels corresponding to the client image and the server image and marks transparent those pixels in the server image that are closer in the client image. The effect is to create an image of the merged client and server scene, then erase those pixels that correspond to objects in the client partition of the scene. The output of the transparency facility 519 is an image 520 corresponding to the server image but with transparent pixels.

The compress and stamp subsystem 504 is responsible for timestamping the information that is being passed from the renderer 500 and eventually to the multiplexer 408. The timestamping is required to enable the client 403 to synchronize the data that is being received over the network 402. The image with transparent pixels 520 can also be compressed to reduce the bandwidth required across the network 402. After timestamping and compression are done, the output of the bideo system, called bideo out 505, is passed to the multiplexer 408. The rate 506 functionality is provided as a means for the compress and stamp subsystem 504 to pass feedback to the renderer 500, for instance, if the images 501 are being passed too quickly for the compressor 504 to keep up.

The three-dimensional system 411 generates streamed three-dimensional geometry. Initially the geometry is passed to the three-dimensional system 411 from the three-dimensional facility 409. The geometry is then partitioned 507 into smaller pieces of data which are then ordered 508 according to a priority scheme, which may or may not be influenced by the client 403. Once the pieces of data have been partitioned 507 and ordered 508, they may be compressed 509 and sent as three-dimensional out 510 to the multiplexer 408.

The camera out system 511 passes the parameters describing the server camera, in block 412, to the multiplexer 408 to be sent to the client 403. The camera 412 is required by the renderer 500 and may optionally be modified on the server 401, although typically this is not the case.

A quality of service, or QOS, system 512 is part of the descriptor generating system 406 also. The QOS system 512 interprets some of the feedback 414 sent from the client 403 to the server 401. The QOS system 512 can influence the rendering system 407, by going through the compress and stamp subsystem 504 and the rate function mechanism 506, and also the three-dimensional system 411. For example, when sending images across a network, there is typically a tradeoff between fidelity and frame rate. In other words, high quality images require more time to produce and therefore the number of images sent in a fixed amount of time, also called the frame rate, decreases. Similarly, low quality images can be produced much faster and therefore the client receives images at a much higher frame rate. Thus, one form of feedback from the client would be to indicate the desired quality of the images it wishes to receive, or the frame rate at which it would like to receive the images.

Figure 6:
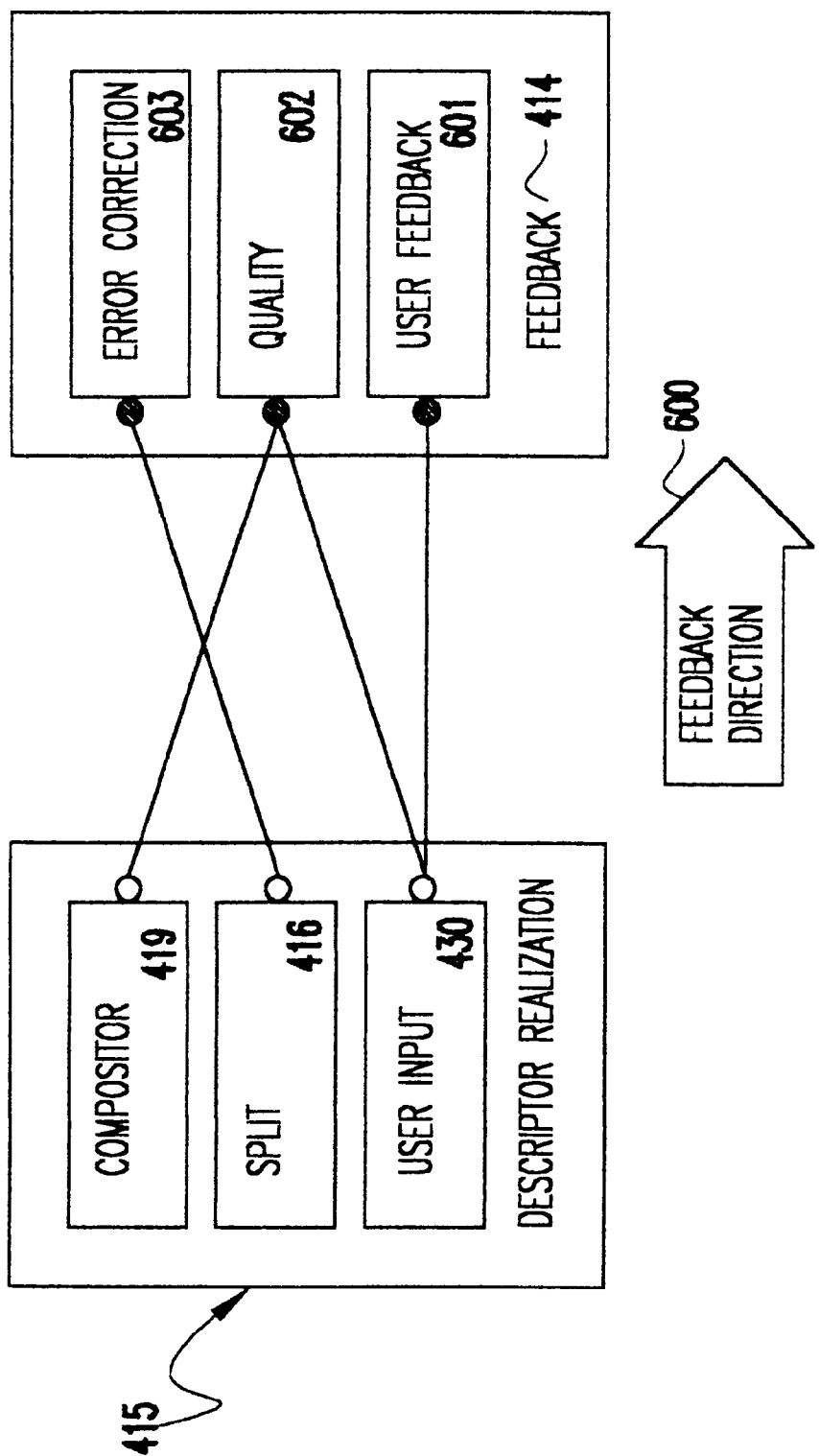
FIG. 6 is a block diagram showing the client feedback components in the invention.

FIG. 6 is a block diagram showing the client feedback components in the current invention. The feedback direction 600 indicates that the feedback 414 is from the client 403, in particular the descriptor realization system 415, to the server 401. Within the descriptor realization system 415, there are three systems that can provide feedback to the server: the compositor 419, the demultiplexer 416, and the user interface mechanism 430. The compositor 419 can affect the quality 602 of the descriptors 413 that are being sent to the client 403. For example, the compositor 419 knows at what frame rate 506 the images 435 are being displayed for the user, and therefore the compositor 419 can inform the server 401 that it should send images 501 faster if it is not keeping up with the current frame rate. The demultiplexer or splitter 416 sends feedback to the server 401 in the form of error correction 603. This particular feedback mechanism is prior art and involves the reliable delivery of content from the server 401 to the client 403. The reliable delivery can be accomplished, for example, by using TCP (Transmission Control Protocol) or using reliable UDP (User Datagram Protocol). The user input mechanism 430 also affects the quality 602 of the descriptors 413 sent to the client 403, as well as traditional user feedback 601 in which the camera position is modified by the client 403. There are additional scenarios in which user feedback 601 is sent to the server 401, and these are discussed in FIG. 7. The quality feedback 602 can also allow the user to specify to the server 401 whether to send better quality images or additional geometry to be rendered locally.

Figure 7:
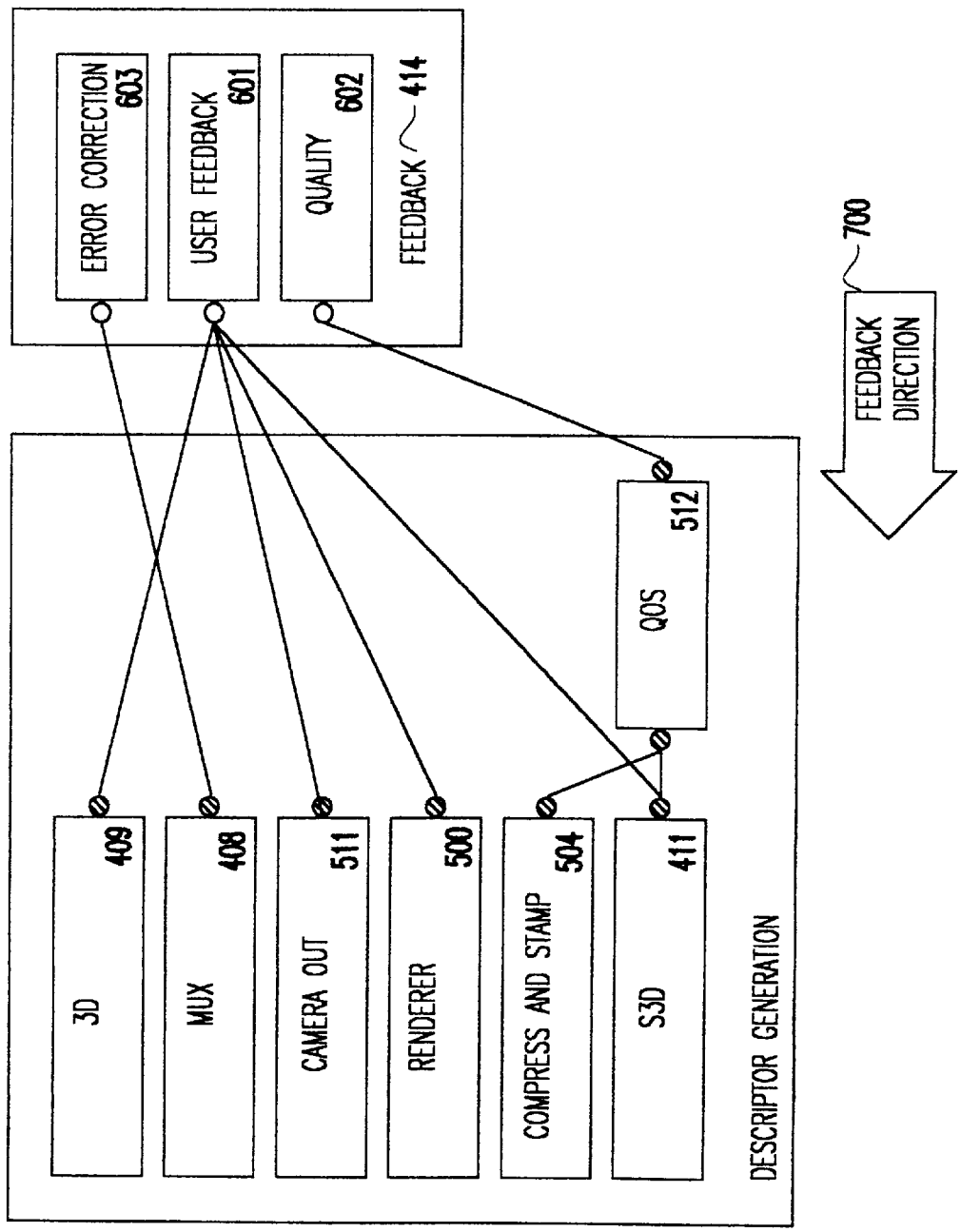
FIG. 7 is a block diagram showing the server components responsible for processing the client feedback.

FIG. 7 is a block diagram showing the server components responsible for processing the client feedback 414. The direction of feedback 700 continues to point from the client 403 to the server 401. As indicated originally in FIG. 6, the three categories of client feedback are error correction 603, user feedback 601, and quality 602. The error correction feedback 603, involving prior art reliable delivery requirements, is handled by the multiplexer 408. User feedback 601 is passed back to a multitude of systems, described as follows. The user can indicate a change in the geometric model scene, for example by transforming the location of a particular model. Such a request is handled by the three-dimensional facility 409. The user can modify the camera parameters which is processed by the camera out system 511. A request to change the size or resolution of the image would be processed directly by the renderer 500. The final type of user feedback 601 consists of requests for specific components of the geometric models to be sent from the server 401 to the client 403, if, for instance, the client 403 wishes to inspect a particular part of a larger assembly. Such requests are handled by the three-dimensional system 411. Quality 602 is handled by the quality of service (QOS) mechanism 512. The QOS mechanism 512 communicates with the compress and stamp subsystem 504 and the three-dimensional system 411.

FIG. 8A is a diagram illustrating prior art bandwidth requirements for client rendering. The Virtual Reality Modeling Language, or VRML, approach involves client-only rendering. Three elements are traditionally sent across the network in the prior art: geometry 211, image 306, and feedback 204. The geometric models 211 are sent across the network 203 and the client 202 must wait until all information has been received, unless clever progressive transmission strategies have been used. Once the geometry is located locally and is being rendered on the client 202, only occasional feedback 204 to the server is necessary. In the other extreme, shown in FIG. 8B, that of server-only rendering, the CATWeb approach sends images 306 to the client 301 occasionally, only after receiving feedback 310 from the client 301 to indicate, for example, a change in camera parameters, or a request to visualize a different geometric model.

Figure 2:
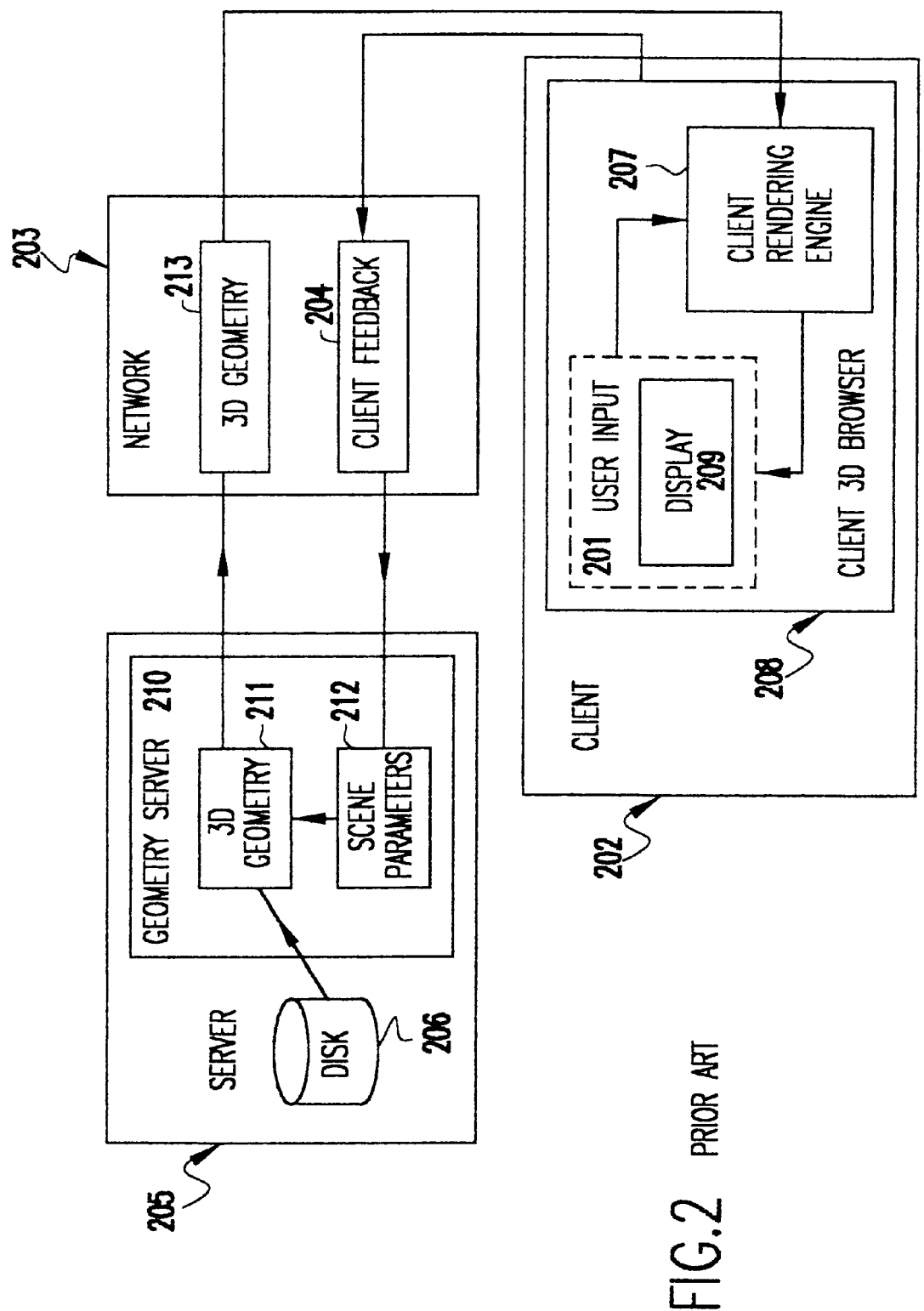
FIG. 2 is a block diagram showing prior art of client-side rendering.
Figure 3:
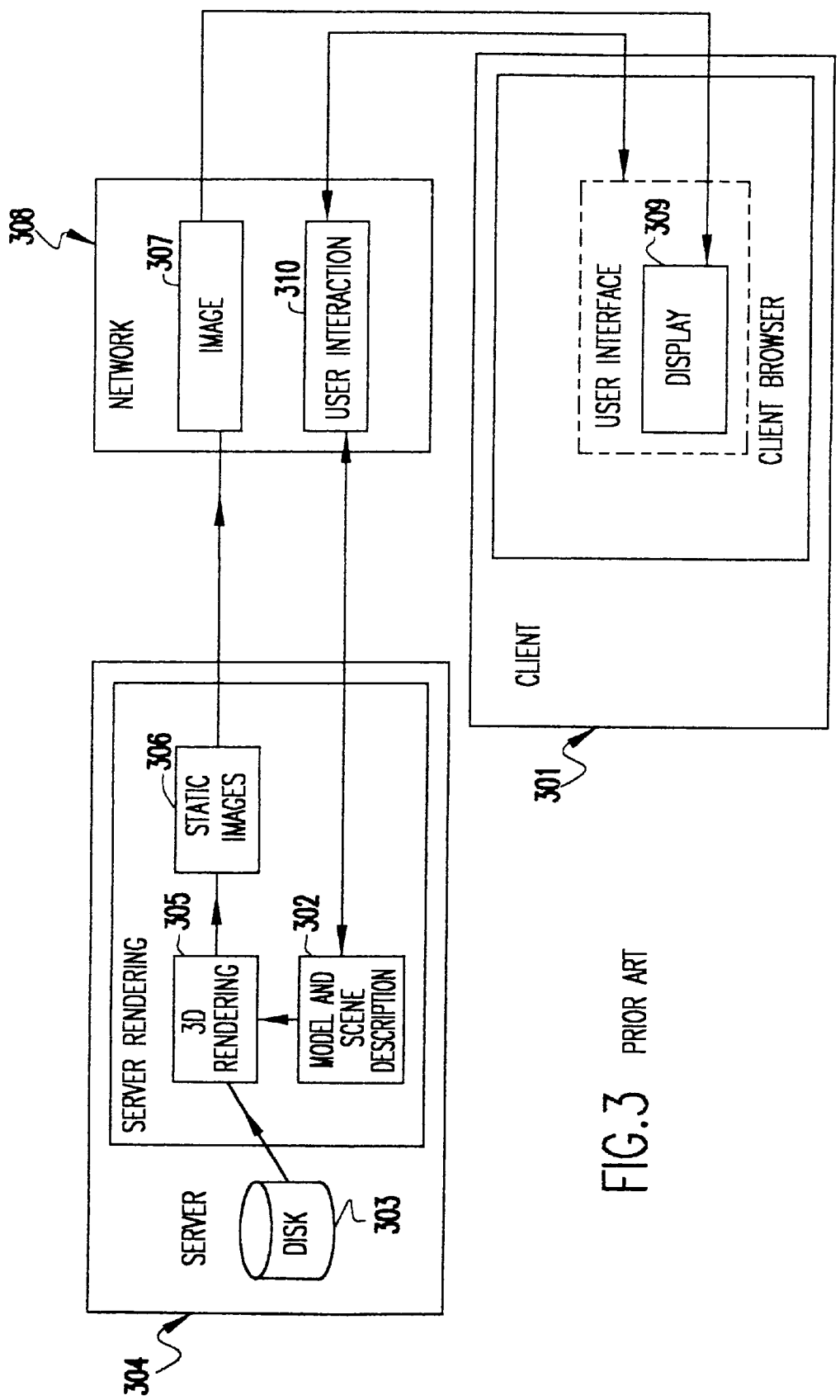
FIG. 3 is a block diagram showing prior art of server-side rendering.
Figure 9A:
FIG. 9A is a diagram illustrating server-side bandwidth requirements for the present invention.
Figure 9B:
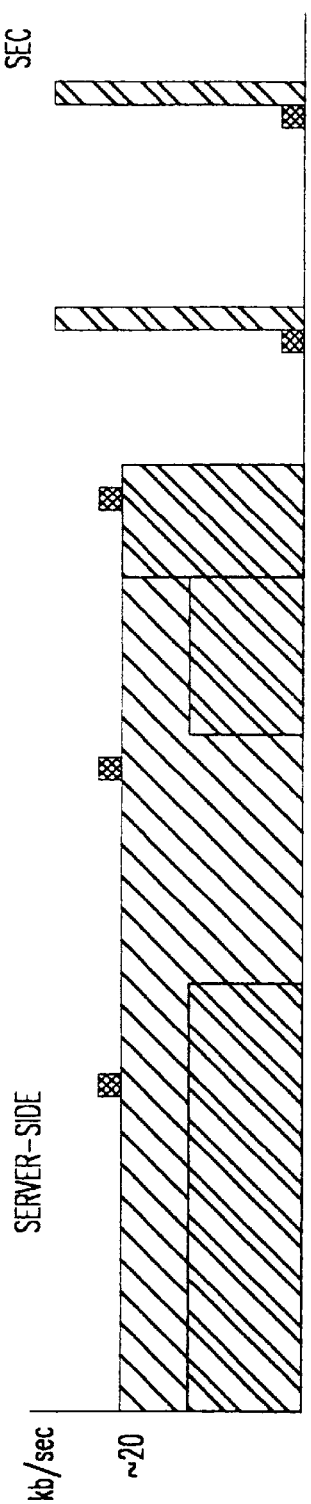
FIG. 9B is a diagram illustrating the mixed client-side and server-side bandwidth requirements for the present invention.
Figure 9C:
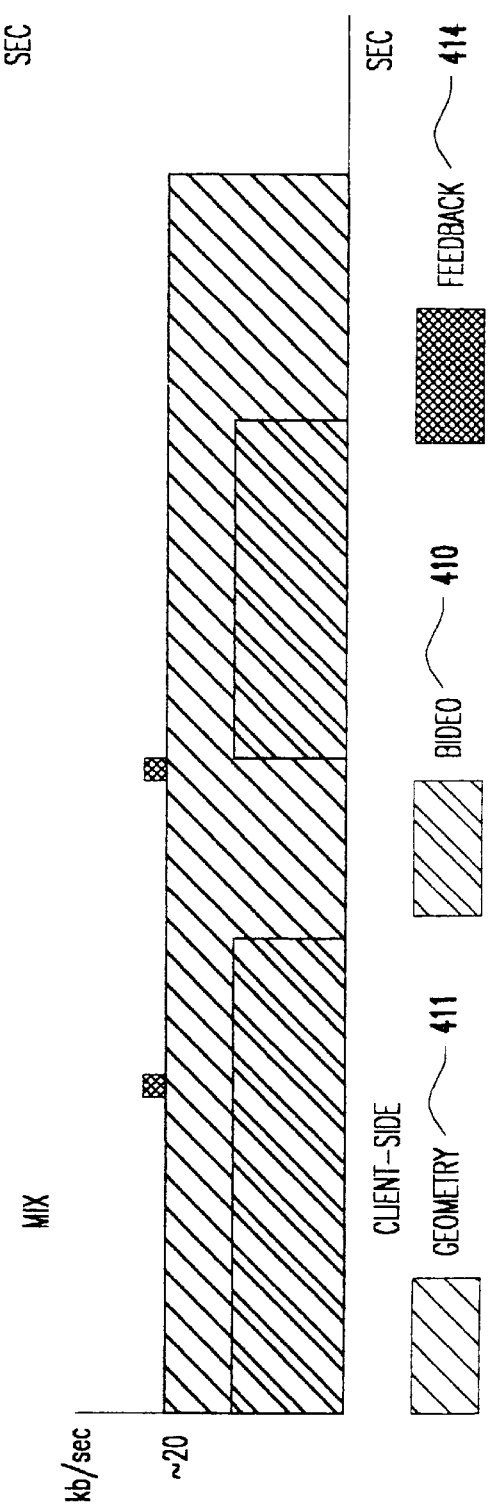
FIG. 9C is a diagram illustrating client-side bandwidth requirements for the present invention.

FIG. 9A is a diagram illustrating bandwidth requirements for the present invention. Three elements are sent across the network in the present invention: streamed geometry 411, bideo 410, and feedback 414. As shown in FIG. 9A, the server-only rendering approach within the present invention is identical to that of the CATWeb approach of FIG. 8B. Images 501 are sent to the client 403 occasionally, only after receiving feedback 414 from the client. The client-only rendering, shown in FIG. 9C, in the present invention is different than the prior art described in FIGS. 2 and 8A. In this case, a combination of bideo 410 and streamed geometry 411 is sent to the client 403 so that some visualization can occur immediately. Once all of the streamed geometry 411 has been obtained by the client 403, no further information is needed from the server 401. In between the two extremes, the server and client renderings can be mixed, as shown in FIG. 9B. Images and depth information 501 are initially sent with streamed geometry 411 until all of the desired geometry has been loaded on the client 403. Then, only bideo 410 is sent to augment the client-side rendering, as determined by the feedback 414 sent to the server 401.

Figure 10:
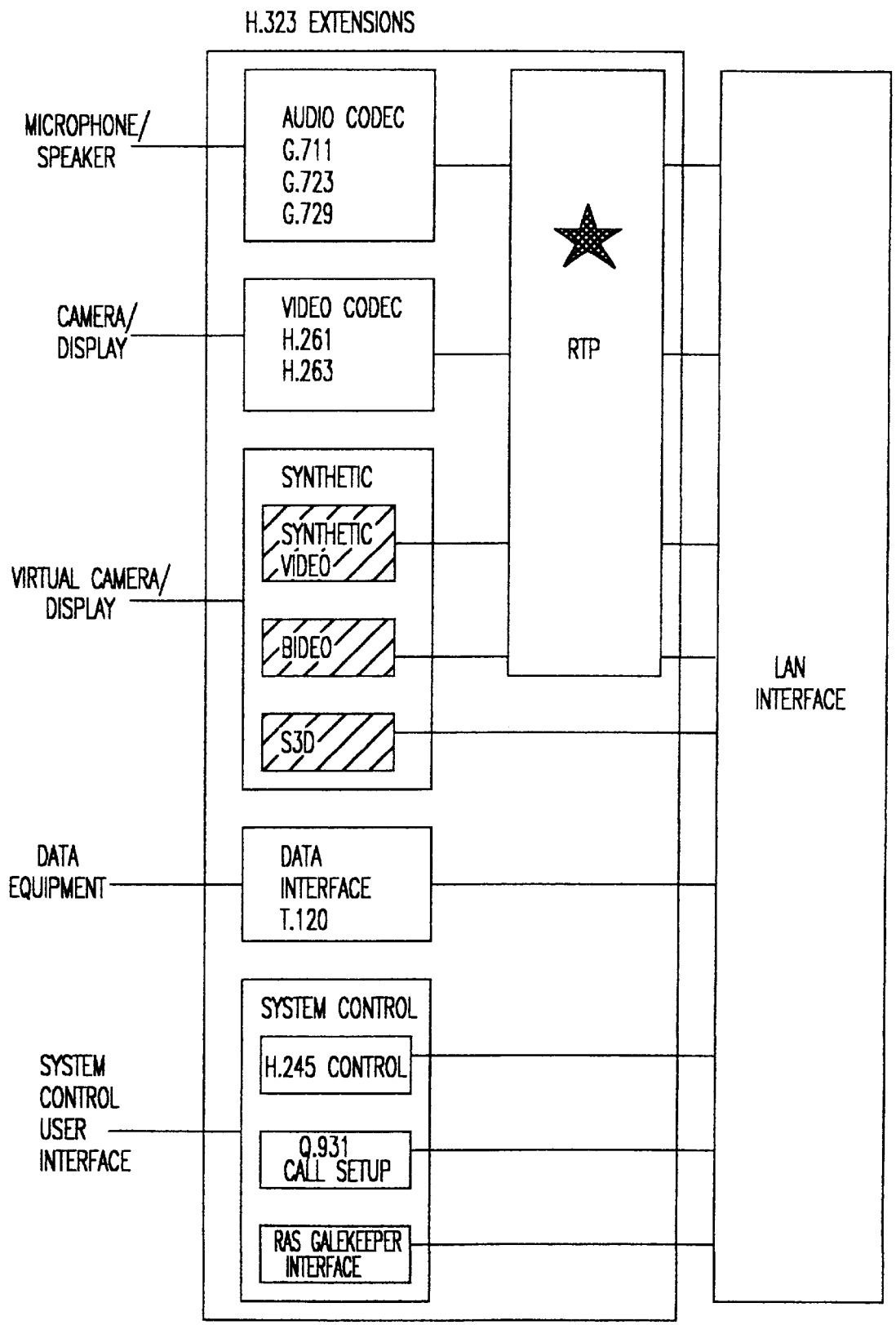
FIG. 10 is a block diagram defining H.323 extensions.

FIG. 10 is a block diagram which highlights a possible extension to the H.323 standard. The International Telecommunications Union (ITU) is an organization that sets standards for multimedia communications. H.323 is a well-established standard within the community of audio, video, and data communications across networks such as the Internet. The shaded region in FIG. 10 shows a possible extension to the H.323 standard, whereby using the present invention, sending synthetic content, such as bideo and geometry, could also be included in the standard.

Figure 11:
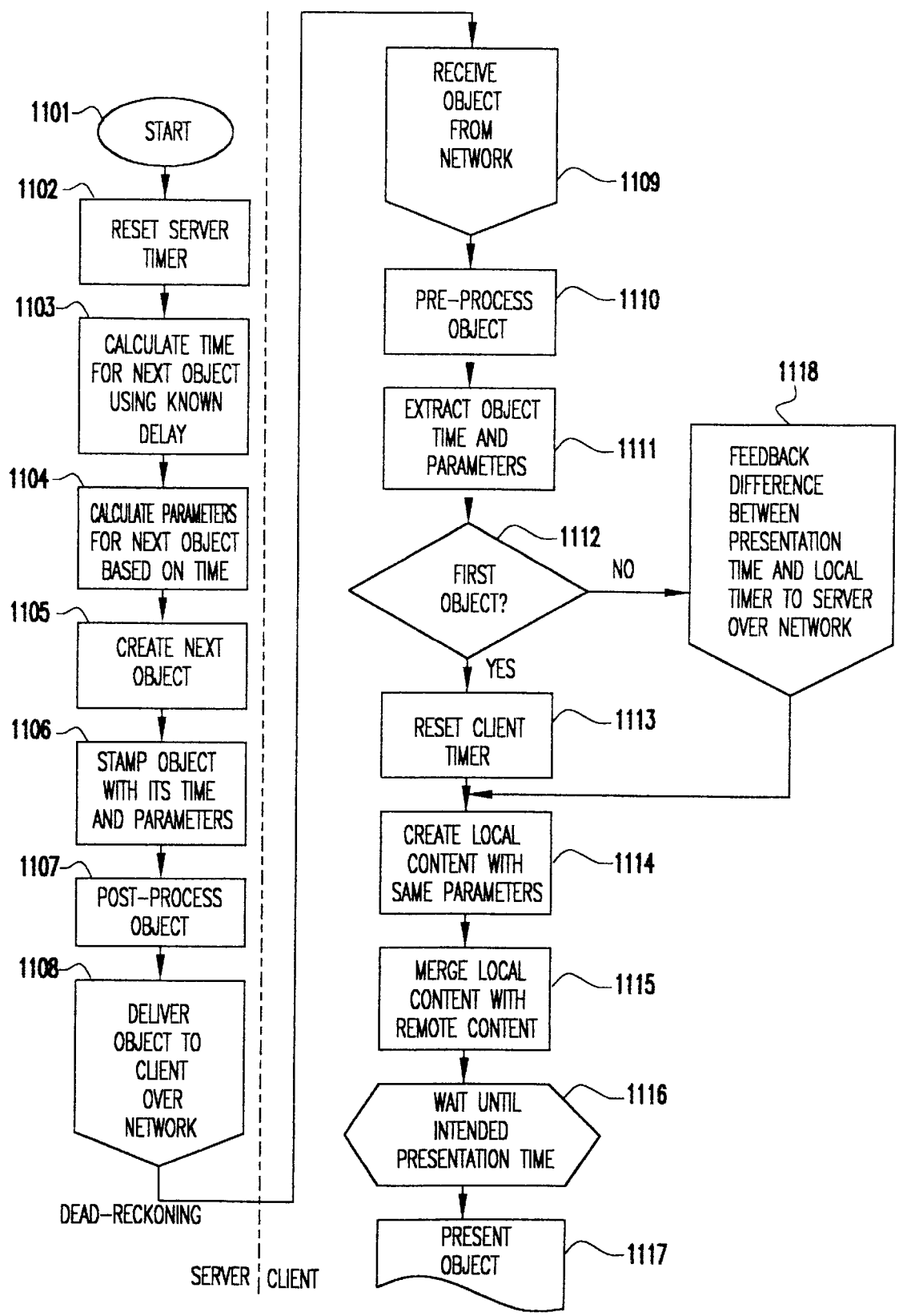
FIG. 11 is flow chart of the dead reckoning process.

FIG. 11 is a flow chart of the dead reckoning process based on the presence of clocks on the server and client. Initial synchronization occurs when streaming begins at the server and the server clock is reset to zero 1102 prior to content creation, compression, and transmission. The client clock is reset 1113 after fully receiving and decompressing the first frame. The client and server clocks are therefore not synchronized in real time, but content created for display at time, T, and time stamped accordingly will automatically be available at time T of the client's clock after transmission and decompression. An error signal can thereafter be fed back from the client to the server indicating the error in the arrival time of a frame and its time stamp, allowing dynamic modifications to the server clock to keep its delivery of media in synch with the client.

When interaction occurs on the client side, the gesture and its client time stamp are sent to the server and used in a predictor algorithm to begin tracking the motion requested. Network delays on both trips between client and server will be accommodated and the media streamed from the server to the client, after a brief delay, will by in synch with the requested motion.

More specifically, steps 1101–1108 illustrate the steps done on the server side. The process starts 1101 after initiation by the server or upon request from the client. In function block 1102, the server timer is reset. In function block 1103, the time is calculated for the next object using known delay. Initially this is approximate, but once feedback 1118 begins arriving from the client this value will be refined. Then, in function block 1104, parameters are calculated for the next object based on its anticipated presentation time. This includes the time it takes the server to create the object and the time it takes to deliver the object to the client. In function block 1105, the object is created using the parameters calculated in 1104. In function block 1106, the object is stamped with its time and other parameters. In function block 1107, any post-processing of the object, such as compression, is done. Then, in step 1108, the object is delivered to the client over network.

Steps 1109–1117 show the steps on the client side. In step 1109, the client receives object from the network, and pre-processes the object in function block 1110. In function block 1111, the client extracts time and other properties associated with object. In decision block 1112, a determination is made whether the object received is the first object. If the object received is the first object, then the client timer is reset in function block 1113. The server resets its timer before creating the first object, and the client reset its timer on receipt of the first object. If the object is not the first object, then in step 1118, the difference between the presentation time stamped on the object and the actual local time the object was ready for presentation is fed back to the server over the network. Then, in function block 1114, local content is created with the same parameters, which is to be embedded in the server content. In function block 1115, the local content is merged with the remote content. In step 1116, the client waits until the intended presentation time. Then, in step 1117, the scene containing merged content from the client and the server is displayed.

Figure 12:
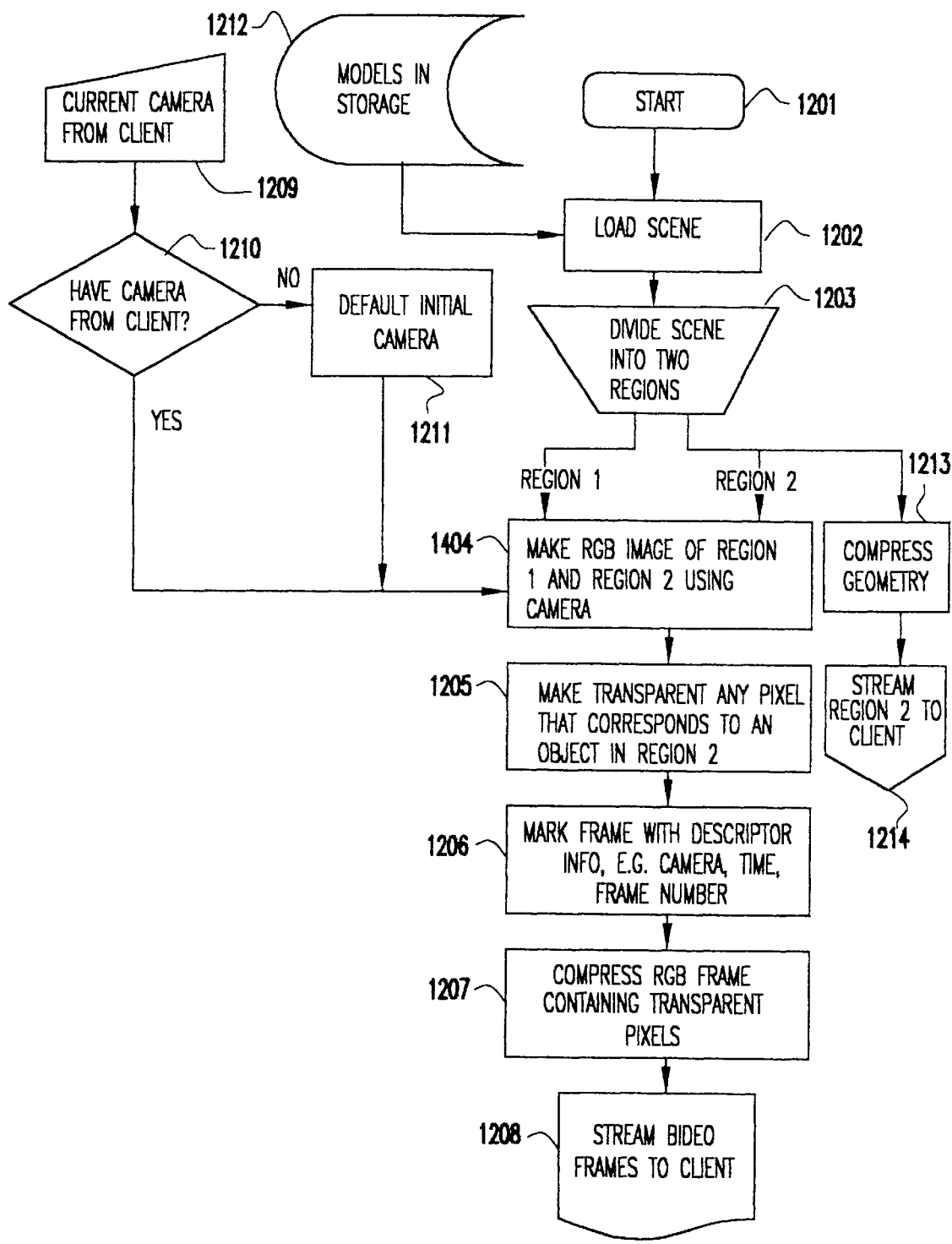
FIG. 12 is a flow chart of the "bideo" server.

FIG. 12 is a flow chart of the "bideo" server process. The bideo server starts a session 1201 on its own or by request from the client. In function block 1202, a scene is loaded containing 3D objects from models in storage, 1212. In step 1203, the scene is divided into two regions, based on location, complexity, or client interest. In the case of client interest, one object may be of greater importance and should be sent directly to the client as geometry. In function block 1213, the geometry of region 2 is compressed, and subsequently streamed to the client 1214. In decision block 1210, a test is made to determine whether there is a current camera available from the client. If there is a camera received from the client, received via 1209, it is used for rendering in function block 1204; otherwise a default initial camera 1211 is utilized. In function block 1204, a single RGB image of regions 1 and 2 is made using the camera provided in decision block 1210. In function block 1205, each pixel is checked in the image, and any pixel that corresponds to an object in region 2 is marked as transparent. Such pixels will correspond to objects in region 2 being in front of objects in region 1. In function block 1206, the RGB image frame is marked with descriptor information, such as camera parameters, time, and frame number. In function block 1207, the RGB frame containing transparent pixels is compressed. Then in step 1208, the RGB frames with their transparent pixels and descriptor information are streamed as "bideo" to the client.

Figure 13:
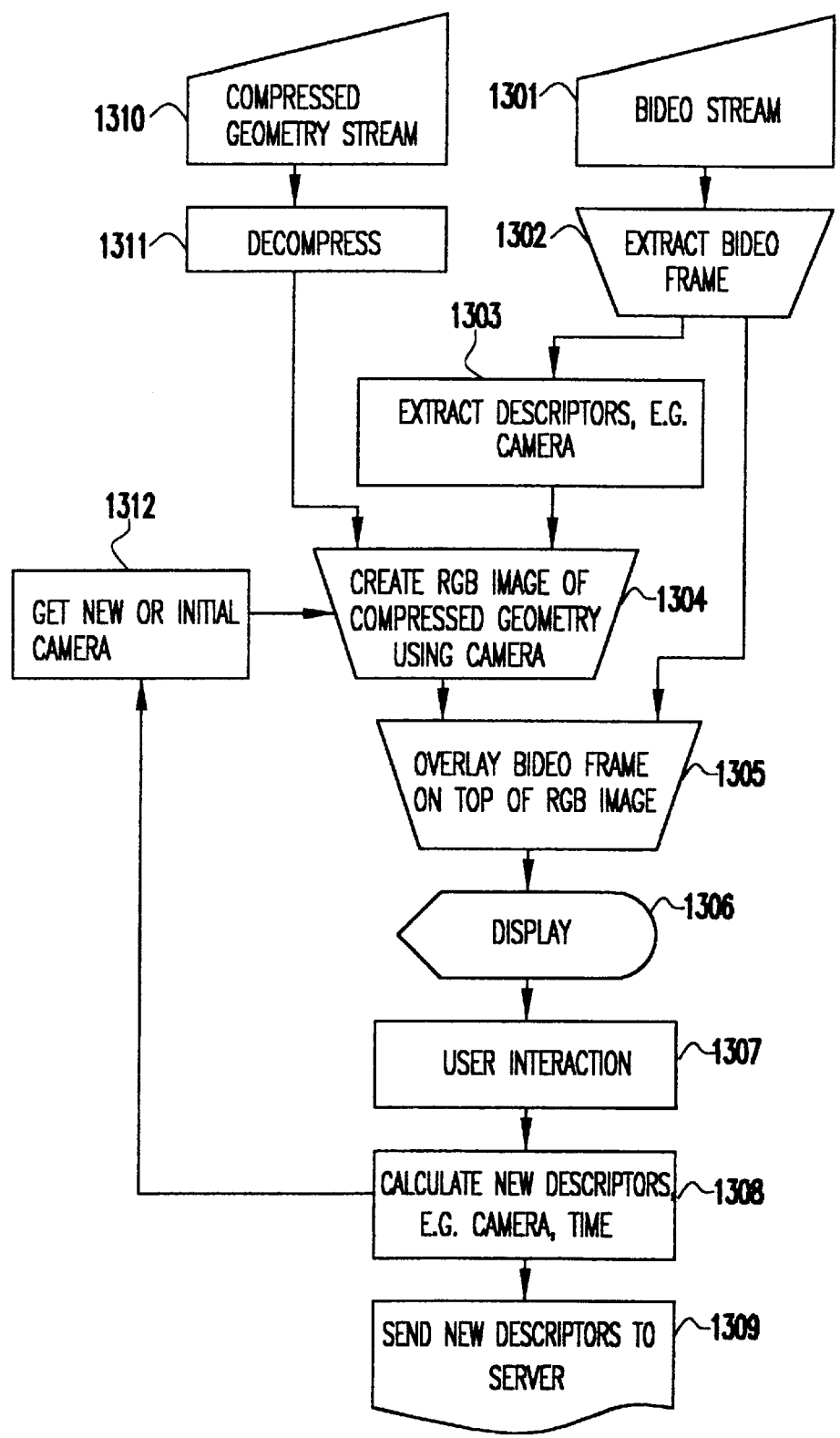
FIG. 13 is a flow chart of the "bideo" client.

FIG. 13 is a flow chart of the "bideo" client process. In step 1301, a Bideo stream containing RGB frames with transparent pixels and descriptor information from the server is received. In step 1302, the bideo frame is extracted and decompressed. In function block 1303, the descriptor information, in particular the camera parameters used to create that frame, is extracted. In step 1310, the compressed geometry stream from the server, corresponding to objects in region 2, is received. In function block 1311, the geometry is decompressed, and the corresponding 3D objects in region 2 are created. In function block 1312, a camera is obtained, either from local user interaction, if it has occurred, or from a default initial camera. In step 1304, RGB images of region 2 are created using the camera contained in the descriptor information of the latest bideo frame, as extracted in 1303. In step 1305, the bideo frame is overlaid with its transparent pixels on top of the RGB image of region 2 created in 1304. This allows the locally rendered version of region 2 to display through the bideo image. The merged scene is displayed 1306 to the user. In function block 1307, the user interacts with the scene by rotation, zooming, etc. In function block 1308, new descriptors, e.g. camera and time, are calculated based on the user's interaction and the current time. Then, in function block 1309, the new descriptors are sent back to the server for use in following bideo frames.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer imaging system comprising:

a central processing unit (CPU), at least one memory, and a network interface to one or more networks;

at least one scene model stored in said at least one memory, each said at least one scene model having at least one first part and at least one second part, each said at least one first part having a first three-dimensional geometric model and each said at least one second part having a second three-dimensional geometric model;

means for converting the first and second three-dimensional geometric models into a first and second two-dimensional image with depth information;

means for comparing the pixels in the first and second two-dimensional images with depth information to determine if the second three-dimensional geometric model is in front of the first three-dimensional geometric model;

means for creating a new partially transparent two-dimensional image with transparent pixels corresponding to where the second three-dimensional geometric model is in front of the first three-dimensional geometric model;

means for providing the position of the partially transparent two-dimensional image with respect to the second three-dimensional geometric model; and means for transmitting the second three-dimensional model, the partially transparent two-dimensional image, and the position of the partially transparent two-dimensional image with respect to the second three-dimensional geometric model through the network interfaces to the network.

2. The computer imaging system according to claim 1, wherein said converting means and said position means reside on a server.

3. The computer imaging system according to claim 2, wherein said position means provides at least one of the following position parameters: a viewpoint, an orientation, a width, and a range.

4. The computer imaging system according to claim 1, wherein the transmitting means further transmits the first three-dimensional geometric model.

5. The computer imaging system according to claim 1, wherein a client receiving at least of the second three-dimensional geometric model, the first two-dimensional image, and the position of the first two-dimensional image with respect to the second three-dimensional geometric model transmits a quality of service message to the server via the network interface.

6. The computer imaging system according to claim 5, where the quality of service message includes at least one of a stop, a request for a faster frame rate of the first two-dimensional image, a request for a faster frame rate of the depth information, an improved resolution of the first two-dimensional image, a request for a slower frame rate of the first two-dimensional image, a request for a slower frame rate of the depth information, a lower resolution of the first two-dimensional image, a bit rate for the first 3-dimensional geometric model, a delay message, and a delay message that controls a clock.

7. A computer imaging system comprising:
   a central processing unit (CPU), at least one memory, and a network interface to one or more networks;
   at least one scene model stored in said at least one memory, each said at least one scene model having at least one first part and at least one second part, each said at least one first part having a first three-dimensional geometric model and each said at least one second part having a second three-dimensional geometric model;
   means for rendering said first and said second three-dimensional geometric models;
   means for determining which of one or more parts of the first three-dimensional model is in front of the second three-dimensional geometric model, and marking those parts as transparent;
   means for converting each of said at least one scene model into a two-dimensional image where the pixels corresponding to transparent surfaces are given a color indicating they are transparent; and
   means for transmitting at least the first two-dimensional image, the position of the first two-dimensional image, and time through the network interface to the network.

8. The computer imaging system according to claim 7, further comprising:
   means for streaming the geometry of all, part, or none of each of said at least one scene model from a remote server machine to a local client machine; and
   means for streaming two-dimensional animations of all or part of each of said at least one scene model from the server to the client in a form that includes a depth value for each pixel;
   means for dividing each of said one or more scene models into client- and server-rendered objects, wherein a server renders each of said at least one scene model and colors pixels that correspond to client-rendered objects in the color indicating that they are transparent, and streams two-dimensional animations of the scene.

9. The system as recited in claim 8 further comprising means for rendering client geometry and directly overlaying a server-rendered frame on the client-rendered geometry so that client-rendered parts of the scene are visible through the transparent regions.

10. The system as recited in claim 9 further comprising means for compressing and streaming the client-rendered scene geometry that allows reconstruction of the geometry by the client as the streamed geometry stream arrives.

11. The system as recited in claim 10 further implementing a dynamic compression mode and comprising:
   means for the server to determine whether client view parameters and scene contents are changing;
   means for the server to begin sending individual frames that have successively higher resolution in at least one of color or depth;
   means for the server to begin sending frames that, when merged, produce a progressively higher and higher resolution in at least one of color or depth; and
   means for the server to detect changes in client view parameters or scene contents and begin streaming low resolution color and depth frames.

12. The system as recited in claim 11 further comprising:
   means for providing user interaction commands with each of said at least one scene model;
   means for communicating the user interaction commands to the server;
   means for enabling the server to communicate to the client a depth range of each frame to allow merging the client-rendered scene geometry into the server-rendered frames; and
   means for the server to communicate to the client the view parameters of each frame.

13. The system as recited in claim 12 wherein the view parameters include at least one of view point, view orientation, view frustum, and use of perspective.

14. The system as recited in claim 13 further comprising means for synchronizing client and server content and accommodating latency due to at least one of network delays, compression time, and decompression time.

15. The system as recited in claim 14, wherein said synchronizing means comprises:
   independently running client and server clocks;
   means for initially synchronizing said client and server clocks to accommodate latency on the server, network, and client;
   means for the server to communicate to the client a timestamp for each frame that aids in synchronizing frames that arrive on time, and rejecting or delaying frames that do not arrive on time; and
   means for providing feedback from the client to the server regarding the measured error in the arrival time of the frames and their timestamp to dynamically adapt to latencies in the system and their changes.

16. The system as recited in claim 14 further comprising:
   a user interaction mode that allows predictive rendering by the server; and
   means for the server to compensate for client-server latency by using a deduced time lag and said user interaction mode to pre-render images so they arrive at the client on time.

17. The system as recited in claim 16, wherein said user interaction mode enables a user to interact with respect to at least one of rotation about an axis, motion along a path through space, panning, and zooming.

18. A computer implemented method for interactively using three dimensional models across a network, comprising the steps of:

storing at least one scene model in at least one memory of a computer, each said at least one scene model having at least one first part and at least one second part, each said at least one first part having a first three-dimensional geometric model and each said at least one second part having a second three-dimensional geometric model;

rendering the first and said second three-dimensional geometric models;

determining which of one or more parts of the first three-dimensional model is in front of the second three-dimensional geometric model, and marking those parts as transparent;

converting each of said at least one scene model into a two-dimensional image, wherein the pixels corresponding to transparent surfaces are given a color indicating they are transparent; and transmitting at least the first two-dimensional image, the position of the first two-dimensional image, and time through the network interface to the network.

19. The computer implemented method as recited in claim 18, further comprising the steps of:

streaming the geometry of all, part, or none of each of said at least one scene model from a remote server machine to a local client machine; and dividing each of said one or more scene models into client- and server-rendered objects, wherein a server renders each of said at least one scene models and colors pixels that correspond to client-rendered objects in the color indicating that they are transparent, and streams two-dimensional animations of the scene.

20. The computer implemented method as recited in claim 19 further comprising the step of rendering client geometry and directly overlaying a server-rendered frame on the client-rendered geometry so that client-rendered parts of the scene are visible through the transparent regions.

21. The computer implemented method as recited in claim 20 further comprising the step of compressing and streaming the client-rendered scene geometry for allowing reconstruction of the geometry by the client as the streamed geometry stream arrives.

22. The computer implemented method as recited in claim 21 further comprising the steps of:

determining whether client view parameters and scene contents are changing;

prompting the server to begin sending individual frames that have successively higher resolution in at least one of color or depth;

prompting the server to begin sending frames that, when merged, produce a progressively higher and higher resolution in at least one of color or depth, and detecting changes in client view parameters or scene contents and begin streaming low resolution color and depth frames.

23. The computer implemented method as recited in claim 22 further comprising the steps of:

providing user interaction commands with each of said at least one scene model;

communicating the user interaction commands to the server;

enabling the server to communicate to the client a depth range of each frame to allow merging the client-rendered scene geometry into the server-rendered frames; and communicating to the client the view parameters of each frame.

24. The computer implemented method as recited in claim 23 wherein the view parameters include at least one of: view point, view orientation, view frustum, and use of perspective.

25. The computer implemented method as recited in claim 24 further comprising the step of synchronizing client and server content and accommodating latency due to at least one of network delays, compression time, and decompression time.

26. The computer implemented method as recited in claim 25, wherein said synchronizing means comprises:

providing independently running client and server clocks;

synchronizing said client and server clocks to accommodate latency on the server, network, and client;

communicating to the client a timestamp for each frame that aids in synchronizing frames that arrive on time, and rejecting or delaying frames that do not arrive on time; and providing feedback from the client to the server regarding the measured error in the arrival time of the frames and their timestamp to dynamically adapt to latencies in the system and their changes.

27. The computer implemented method as recited in claim 25 further comprising the step of:

providing a user interaction mode that allows predictive rendering by the server; and compensating for client-server latency by using a deduced time lag.

28. The computer implemented method as recited in claim 27, wherein the step of providing the user interaction mode enables a user to interact with respect to at least one of: rotation about an axis, motion along a path through space, panning, and zooming.

29. A computer program product comprising a computer usable medium having computer readable program code embodied in the medium for processing digital images, the computer program product having:

first computer program code for streaming the geometry of all, part, or none of each of said at least one scene model from a remote server machine to a local client machine;

second computer program code for streaming two-dimensional animations of all or part of each of said at least one scene model from the server to the client in a form that includes a depth value for each pixel;

third computer program code for dividing each of said one or more scene models into client- and server-rendered objects, wherein a server renders each of said at least one scene models and colors pixels that correspond to client-rendered objects in the color indicating that they are transparent, and streams two-dimensional animations of the scene.

30. A computer program product according to claim 29, further comprising:

fourth computer program code for rendering client geometry and directly overlaying a server-rendered frame on the client-rendered geometry so that client-rendered parts of the scene are visible through the transparent regions.

31. A computer program product according to claim 30, further comprising:

fifth computer program code for compressing and streaming the client-rendered scene geometry that allows reconstruction of the geometry by the client as the streamed geometry stream arrives.

32. A computer program product according to claim 31, further comprising:

sixth computer program code for compressing a color and depth image stream by one or more of the following:

intraframe compression of the color and depth independently as individual frames;

interframe compression of the color and depth as separate animations; and interframe compression of the color and depth joined together into a single animation of the color and depth frames side by side or top to bottom.

* * * * *